Figure 1:
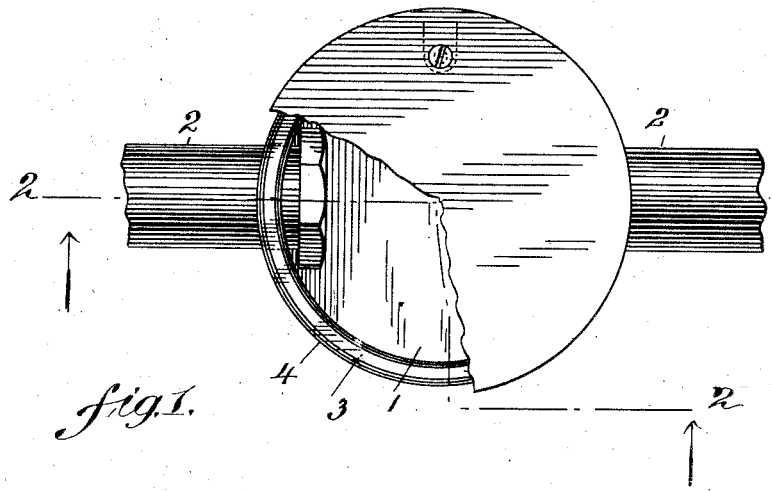

G. A. LUTZ.
APPLIANCE FOR SYSTEMS OF ELECTRICAL DISTRIBUTION.
APPLICATION FILED NOV. 28, 1908. RENEWED JAN. 4, 1910.

948,819.

Patented Feb. 8, 1910.

Witnesses:

Inventor
George A. Lutz.
By his Attorney
P. F. Bourne

UNITED STATES PATENT OFFICE.

GEORGE A. LUTZ, OF PLAINFIELD, NEW JERSEY, ASSIGNOR TO AMERICAN CIRCULAR LOOM COMPANY, OF PORTLAND, MAINE, A CORPORATION OF MAINE.

APPLIANCE FOR SYSTEMS OF ELECTRICAL DISTRIBUTION.

948,819.  Specification of Letters Patent.  Patented Feb. 8, 1910.

Application filed November 28, 1908, Serial No. 465,290. Renewed January 4, 1910. Serial No. 536,406.

*To all whom it may concern:*

Be it known that I, GEORGE A. LUTZ, a citizen of the United States, and resident of Plainfield, in the county of Union and State of New Jersey, have invented certain new and useful Improvements in Appliances for Systems of Electrical Distribution, of which the following is a specification.

Metal conduits, such as pipes or tubes, outlet and junction boxes, and analogous fittings, used in systems of electrical distribution, particularly such systems placed in buildings, are liable to rust. To obviate rusting such conduits, boxes and fittings have been protected with an insulating compound applied on the surface thereof, and also with an electrodeposit, such as galvanizing, applied upon such surfaces. But in practice it is found that notwithstanding such covering such conduits, fittings etc. are liable to rust in different places owing to the inability to so thoroughly clean the metal surfaces that the compound or electrodeposit will cover all spots or places on such surfaces, and thus rusting is liable to take place on such spots or places.

The object of my invention is to protect the surface of conduits, outlet boxes, and analogous fittings in such systems in such manner as to assure against rusting of the metal. To this end I first thoroughly clean the surfaces of the metal conduits or pipes, outlet boxes, and analogous fittings for the system, and then apply a conductive coating upon such surface, comprising graphite, and upon such graphite coating I apply a metal deposit, as an electrodeposit, such as zinc or other metal, whereby the graphite coating is protected. The graphite coating may be applied to the metal surface by a brush, and to this end may be mixed with any suitable fluid to produce a paste or fluid-like substance containing the graphite. Such graphite coating upon the metal surface may be placed on the exterior surface of the conduits or tubes, or on the interior surface thereof, or on such interior and exterior surfaces, and likewise the graphite coating may be placed upon the interior or exterior surfaces, or upon the interior and exterior surfaces, of the outlet or junction boxes, and analogous fittings of the system and the electrodeposit placed upon such graphite coating. The graphite coating upon such metal surface will serve as a conductive coating between the electrodeposit and the metal surface, bringing the electrodeposit into conductive relation with the metal corresponding appliance of the system. The result is that the electrodeposit upon the graphite protects the graphite coating, and any spots or places not covered by the electrodeposit are protected by the graphite upon the metal surface.

Figure 2:
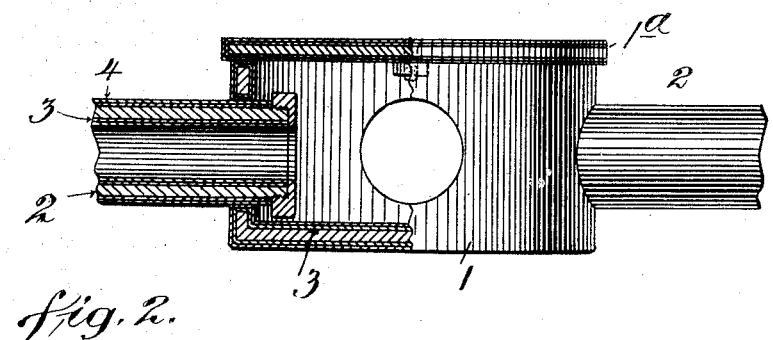

In the accompanying drawings Figure 1 is a partly broken plan view of an outlet or junction box and conduits connected therewith, and Fig. 2 is a side elevation thereof, partly in section on the line 2, 2, in Fig. 1.

An outlet or junction box of suitable construction is indicated at 1, and 2 indicates conduits connected therewith in any usual or proper manner. The non-electro deposit or coating, such as graphite, upon the surface of the fitting or box 1 and the conduits 2 is indicated at 3, which may be applied upon the interior or exterior surfaces, or both, of the box, its cover 1ª and the conduits 2. The metal deposit upon the non-electro deposit or coating 3 is indicated at 4, which may be upon the interior or exterior surfaces, or both, of the fitting or conduit.

I am aware that metal objects have been provided upon their surfaces with an insulating coating upon which coating an electrodeposit of copper has been placed, but such coating by insulating the metal object from the copper deposit eliminates conductivity between such object and the copper deposit. By my invention the graphite upon the metal pipe or fitting fills the pores of the latter and likewise fills the pores of the metal deposit that is upon the graphite, to prevent rusting of the pipe or fitting, and at the same time the graphite constitutes a conductive medium between the pipe or fitting and the metal deposit upon the graphite. Hence, I do not claim an insulating coating between the metal object and a metal deposit upon such insulating coating.

Having now described my invention what I claim is:—

1. A new article of commerce comprising a metal appliance for a system of electrical distribution having a non-electro-deposited conductive coating upon its surface and an electrodeposit upon such coating.

2. A new article of commerce comprising a metal appliance for a system of electrical distribution having a coating of graphite upon its surface and an electrodeposit upon such graphite.

3. A new article of commerce comprising a metal conduit having a non-electro-deposited conductive coating upon its surface and an electrodeposit upon such coating.

4. A new article of commerce comprising a metal conduit having a graphite coating upon its surface and a metal deposit upon said graphite.

5. A new article of commerce comprising a metal appliance for a system of electrical distribution having a non-electrodeposited conductive coating upon its surface, and a metal deposit upon such coating.

6. A new article of commerce comprising a metal appliance for a system of electrical distribution having a coating of graphite upon its surface, and a metal deposit upon such graphite.

7. A new article of commerce comprising a metal conduit having a non-electrodeposited conductive coating upon its surface, and a metal deposit upon such coating.

Signed at New York city, in the county of New York, and State of New York, this 27th day of November, A. D. 1908.

GEORGE A. LUTZ.

Witnesses:
T. F. BOURNE,
MARIE F. WAINRIGHT.